US012663630B2

(12) United States Patent (10) Patent No.: US 12,663,630 B2
Gao (45) Date of Patent: Jun. 23, 2026

(54) TILING LIGHT SHEET MICROSCOPE AND IMAGING METHOD OF A SAMPLE

(71) Applicant: WESTLAKE UNIVERSITY, Zhejiang (CN)

(72) Inventor: Liang Gao, Zhejiang (CN)

(73) Assignee: WESTLAKE UNIVERSITY, Zhejiang (CN)

( * ) Notice: Subject to any disclaimer, the term of this patent is extended or adjusted under 35 U.S.C. 154(b) by 214 days.

(21) Appl. No.: 18/282,668

(22) PCT Filed: Mar. 17, 2021

(86) PCT No.: PCT/CN2021/081213

§ 371 (c)(1),
(2) Date: Sep. 18, 2023

(87) PCT Pub. No.: WO2022/193164

PCT Pub. Date: Sep. 22, 2022

(65) Prior Publication Data

US 2024/0176123 A1 May 30, 2024

(51) Int. Cl.
*G02B 21/00* (2006.01)
*G02B 27/28* (2006.01)
(52) U.S. Cl.
CPC ..... *G02B 21/0032* (2013.01); *G02B 21/0048* (2013.01); *G02B 21/0076* (2013.01)
(58) Field of Classification Search
None
See application file for complete search history.

(56) References Cited

U.S. PATENT DOCUMENTS

| | | | |
|---|---|---|---|
| 2018/0045941 A1 | 2/2018 | Gao | |
| 2021/0191097 A1* | 6/2021 | Siebenmorgen | ....... G02B 21/06 |
| 2021/0318530 A1* | 10/2021 | Deissler | ............ G02B 21/0068 |

FOREIGN PATENT DOCUMENTS

| | | |
|---|---|---|
| CN | 103018173 A | 4/2013 |
| CN | 109682819 A | 4/2019 |
| CN | 110687670 A | 1/2020 |

OTHER PUBLICATIONS

International Search Report and Written Opinion, International Application No. PCT/CN2021/081213, mailed Nov. 3, 2021.

* cited by examiner

*Primary Examiner* — Carl Adams
(74) *Attorney, Agent, or Firm* — MARSHALL, GERSTEIN & BORUN LLP

(57) ABSTRACT

A tiling light sheet microscope and imaging method of a sample. The imaging method includes: generating a first laser beam of a first wavelength range and generating a second laser beam of a second wavelength range; performing a first optical modulation on the first laser beam and performing a second optical modulation on the second laser beam; and then combining the first laser beam and the second laser beam. The combined laser beams are directed onto an illumination path, to generate, by scanning the laser beams, a first excitation light sheet and a second excitation light sheet corresponding to the first wavelength range and the second wavelength range, respectively. The two types of excitation light sheets are combined in a propagation direction of excitation light so as to illuminate the sample. The fluorescences emitted by the sample are collected. In this way, for various biological tissues, at least dual-color simultaneous imaging can be performed, to keep same spatial resolution without increasing image acquisition time.

22 Claims, 5 Drawing Sheets

TILING LIGHT SHEET MICROSCOPE AND IMAGING METHOD OF A SAMPLE

TECHNICAL FIELD

The present disclosure relates to a precision optical instrument and using method thereof, and in particular, to a tiling light sheet microscope and imaging method of a sample associated with the same.

BACKGROUND 3D fluorescence imaging of cleared tissues has mainly been performed by imaging physically sectioned tissue slices due to the opaqueness of biological tissues. Tissue clearing enables the light sheet microscope to perform 3D imaging of biological tissue structures with high speed and high spatial resolution by making biological tissues transparent. More importantly, physical tissue sectioning is replaced by optical sectioning of the illumination light sheets, so that the associated sample preparation, image acquisition and image analysis become much more efficient and practical. As a result, tissue clearing in combination with 3D fluorescence imaging using light sheet microscopy is quickly becoming an important method to observe the cellular and subcellular structures of large multicellular organisms, such as organoids, embryos, organs, and even whole model animals.

Multi-color 3D fluorescence imaging, especially dual-color imaging, is usually used to confirm the spatial relationship of different organelles in biological samples. A common way to perform dual-color 3D imaging in light sheet microscope is to switch the excitation lasers on and off sequentially at each image plane to illuminate the sample with different excitation wavelengths. The emitted fluorescence of different colors are filtered through a dual-wavelength channel filter before being focused on the same detection camera. Despite its simplicity in structure, the method suffers from the fluorescence crosstalk between two color channels due to the use of the dual-wavelength channel filter. The fluorescence crosstalk can be reduced by either replacing the dual-channel filter with a filter wheel consists of two single-wavelength channel filters or a dichroic mirror to separate and direct the emission fluorescence of different wavelengths to different detection cameras or different sensor areas of the same detection camera. Nevertheless, dual-color imaging is still performed sequentially with both configurations because of the difficulty in keeping excitation light sheets of two wavelengths in focus simultaneously and avoiding the fluorescence crosstalk, which doubles the image acquisition time, and images observed in two color ranges are not images of same time. Since the process of single-color high-resolution 3D imaging of large-volume biological tissues may last for a few hours to several days or even longer, the sequential dual-color imaging may double the imaging time. Therefore, the sequential dual-color imaging leads to more serious problems, especially for high-resolution 3D imaging of large cleared tissues.

Tiling light sheet microscope (TLS-SPIM) has been successfully used for high-resolution 3D imaging of cleared tissues. TLS-SPIM outperforms conventional light sheet microscope in achieving higher spatial resolution and better optical sectioning ability by translating thin adjustable excitation light sheets across the imaging plane along the propagation direction of excitation light and collecting additional images. Biological tissues can be imaged with isotropic spatial resolutions from a few microns to up to tens of nanometers by using thin tiling light sheets in combination with the latest tissue clearing and tissue expansion techniques. However, the imaging throughput of tiling light sheet microscope is reduced by the light sheet tiling process due to the need to collect additional images. Therefore, sequential dual-color imaging is more of an issue for TLS-SPIM as it further doubles the image acquisition time that has already been extended. The present disclosure is provided to address the above-mentioned deficiencies in the background.

SUMMARY

It is intended to provide a tiling light sheet microscope and imaging method of a sample capable of performing simultaneous at least dual-color imaging for various sample tissues without affecting the spatial resolution or increasing image acquisition time.

In the first aspect, an embodiment of the present disclosure provides a tiling light sheet microscope. The tiling light sheet microscope comprises a first laser configured to generate a first laser beam of a first wavelength range. The tiling light sheet microscope further comprises a first spatial light modulator (SLM) assembly configured to perform modulation on the first laser beam. The tiling light sheet microscope further comprises a second laser configured to generate a second laser beam of a second wavelength range. The tiling light sheet microscope further comprises a second spatial light modulator (SLM) assembly configured to perform modulation on the second laser beam. The tiling light sheet microscope further comprises a combining optics configured to combine the first laser beam modulated with the first SLM assembly and the second laser beam modulated with the second SLM assembly. The tiling light sheet microscope further comprises a galvanometer mirror configured to direct the combined laser beams to an illumination path by offsetting an angle of the galvanometer mirror, and to generate, by scanning the laser beams, two types of excitation light sheets corresponding to the first wavelength range and the second wavelength range respectively, the galvanometer mirror being further arranged to be conjugated to respective optical modulation planes of the first SLM assembly and the second SLM assembly. The tiling light sheet microscope further comprises an excitation objective disposed at an end of the illumination path for illuminating a sample to be detected, the rear pupil of which is conjugated to the respective optical modulation planes of the first SLM assembly and the second SLM assembly. The tiling light sheet microscope further comprises a detection objective configured to collect fluorescence emitted by the sample to be detected.

In a second aspect, an embodiment of the present disclosure provides an imaging method of a sample. The imaging method comprises generating a first laser beam of a first wavelength range and generating a second laser beam of a second wavelength range. The imaging method further comprises performing a first optical modulation on the first laser beam and performing a second optical modulation on the second laser beam. The imaging method further comprises combining the first laser beam after the first optical modulation and the second laser beam after the second optical modulation. The imaging method further comprises directing the combined laser beams to an illumination path, and generating, by scanning the laser beams, a first excitation light sheet and a second excitation light sheet corresponding to the first wavelength range and the second wavelength range respectively. The imaging method further comprises tiling the two types of excitation light sheets independently in a propagation direction of excitation light, so as to illuminate the sample. The imaging method further comprises collecting fluorescence emitted by the sample.

With the tiling light sheet microscope and imaging method of a sample according to each embodiment of the present disclosure, it is capable of performing simultaneous at least dual-color imaging of various biological tissues and keep same spatial resolution without increasing image acquisition time.

BRIEF DESCRIPTION OF THE DRAWINGS

In figures that are not necessarily drawn to scale, the same reference numerals may describe similar components in different figures. The same reference signs with suffixes or different suffixes may denote different examples of similar components. The figures generally show various embodiments, which serve as examples rather than limitation, and are used together with the description and the claims, to describe the disclosed embodiments. Such embodiments are illustrative, and are not intended to be exhaustive or exclusive embodiments of the present device or method.

DETAILED DESCRIPTION

In order to enable those skilled in the art to better understand the technical solutions of the present disclosure, the present disclosure will be described in detail below in conjunction with the accompanying drawings and specific embodiments. The embodiments of the present disclosure will be described in further detail below in conjunction with the accompanying drawings and specific embodiments, but they are not intended to limit the present disclosure.

"First", "second" and similar words used in the present disclosure do not indicate any order, quantity or importance, but are only used to distinguish different components. "Include" or "comprise" and other similar words mean that an element appearing before this word covers an element listed after this word, but do not exclude possibility of covering other elements.

Figure 1:
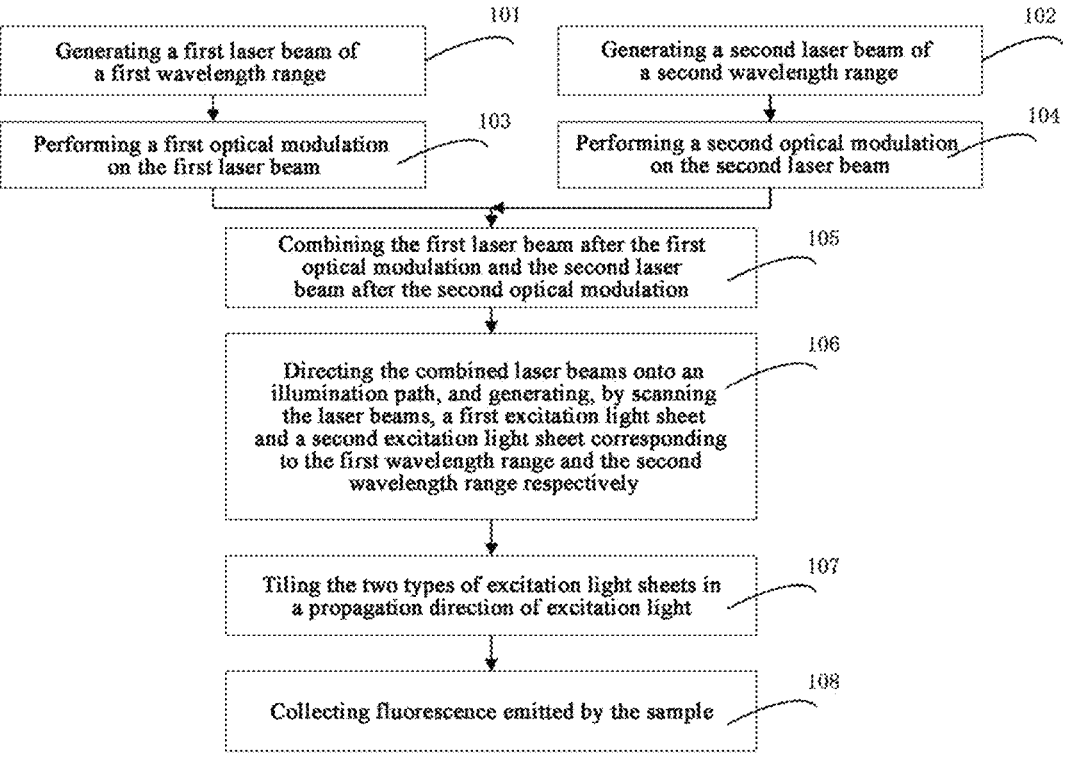
FIG. 1 shows the flowchart of the imaging method of a sample using the tiling light sheet microscope according to an embodiment of the present disclosure.

FIG. 1 shows the flowchart of the imaging method of a sample using the tiling light sheet microscope according to an embodiment of the present disclosure. In FIG. 1, dual-color imaging is exemplified for illustration and a solution of laser beams of two wavelength ranges can be used for dual-color 3D imaging (each wavelength range corresponding to each color channel respectively). However, the present disclosure is not limited thereto, and it can be extended to a solution of laser beams of multiple wavelength ranges for multi-color 3D imaging, which is not repeated herein. The imaging method of the present disclosure is particularly applicable to large-sized samples of cleared tissues, but is not limited thereto, and it is applicable to tissues samples of other types and other sizes, which is not repeated herein. The cleared tissue includes a cleared biological tissue or a biological tissue that is transparent in a natural state.

As shown in FIG. 1, the imaging method comprises generating a first laser beam of a first wavelength range (step 101) and generating a second laser beam of a second wavelength range (step 102) respectively. Therefore, the first laser beam and the second laser beam may be controlled flexibly in aspects of respective activating timings and optical parameters depending on specific needs. In some embodiments, the first laser beam and the second laser beam are activated simultaneously and generated continuously, thereby providing a basis for subsequent synchronous illumination (such as simultaneous illumination) for the same image plane by excitation light sheets of different color channels and keeping focus on the image plane.

Figure 2:
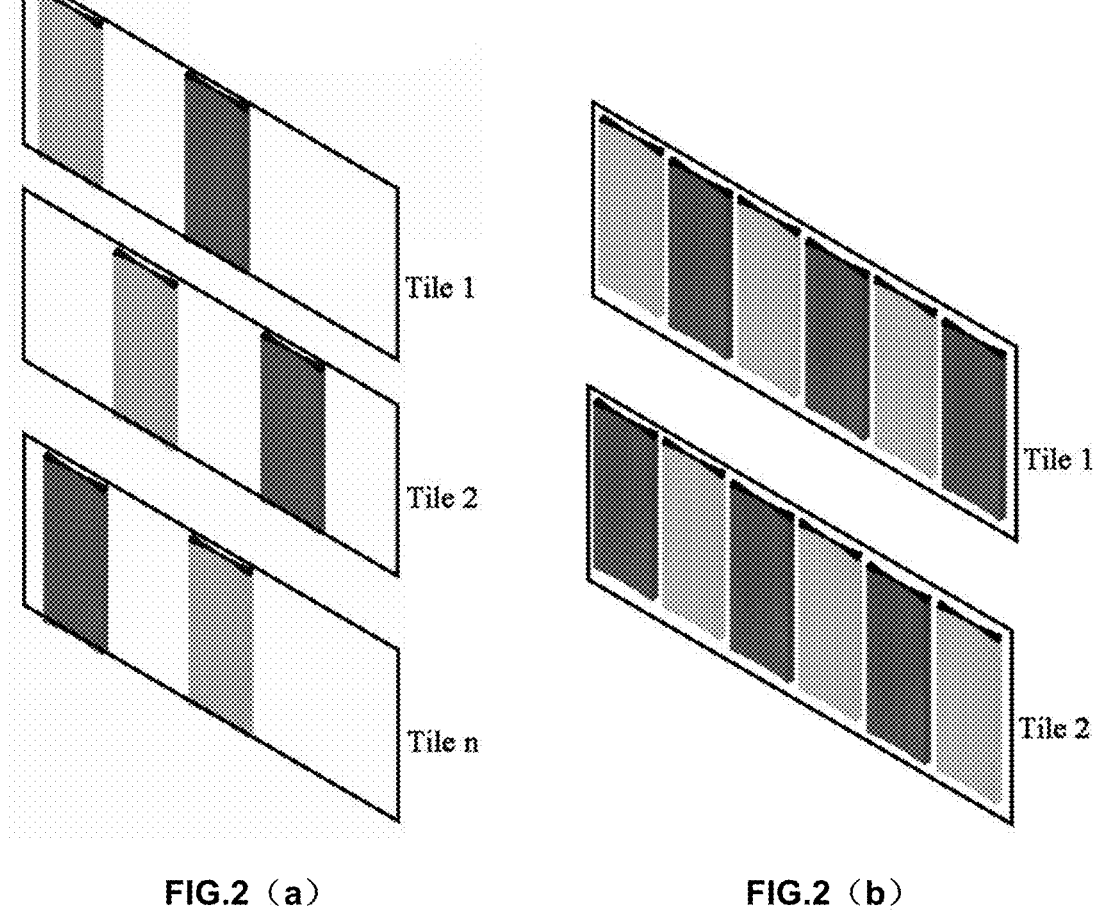
FIG. 2(a) shows an example of the principle of the simultaneous dual-color 3D imaging of the imaging method of the sample according to the embodiment of the present disclosure.
FIG. 2(b) shows another example of the principle of the simultaneous dual-color 3D imaging of the imaging method of the sample according to the embodiment of the present disclosure.

A first optical modulation can be performed on the first laser beam (step 103) and a second optical modulation can be performed on the second laser beam (step 104) respectively. Therefore, the first optical modulation and the second optical modulation can be performed independently from each other. For example, in a case where the first laser beam and the second laser beam are generated synchronously, the first optical modulation and the second optical modulation can be performed synchronously accordingly, thereby realizing subsequent synchronous illumination for the same image plane by excitation light sheets of different color channels and keeping focus on the image plane. Compared with sequential dual-color imaging, the image acquisition time can be reduced and the imaging throughput can be increased significantly without affecting the spatial resolution through independent generation of laser beams of different wavelength ranges and independent modulation of the same. Specifically, an independent optical path can be separately set for each of the laser beams (illumination light) of different wavelength ranges, so as to obtain an optical grid or a group of discontinuous optical grids of the excitation light sheets flexibly, depending on specific needs (for example, but not limited to, spatial separation), with individual controls on each optical path. In some embodiments, separated SLM assemblies can be used, by being loaded with different phase maps, to obtain the required optical grid or group of discontinuous optical grids. The optical grid can be scanned by a galvanometer mirror to obtain corresponding excitation light sheets, such as excitation light sheets of different wavelength ranges (for example, different colors) (see FIG. 2(a)) and a group of discontinuous excitation light sheets of different wavelength ranges (for example, different colors) (see FIG. 2(b)). As an example, in FIG. 2(a), dual-color imaging (colors are identified by textures in the figure) can be performed simultaneously by using two spatially separated tiling light sheets with different excitation wavelengths tiled at different positions. As an example, in FIG. 2(b), dual-color imaging can be performed simultaneously by using two groups of spatially separated discontinuous tiling light sheets. Compared with FIG. 2(a) in which one single excitation light sheet is tiled for each color at a time, one group of discontinuous excitation light sheets are tiled for each color at a time in FIG. 2(b), which can further improve the imaging throughput. In the present disclosure, the expression "two types of excitation light sheets" intends to include two excitation light sheets corresponding to two wavelength ranges (for example, corresponding to two color ranges) (as shown in FIG. 2(*a*)), and to include two groups of discontinuous tiling excitation light sheets corresponding to two wavelength ranges (for example, corresponding to two color ranges) (as shown in FIG. 2(*b*)).

In TLS-SPIM, a SLM assembly can be used to perform phase modulation on the illumination light to generate an excitation light sheet, to adjust the intensity profile of the light sheet, to tile the light sheet(s) to image the entire field of view (FOV). Independent phase modulation of the illumination lights of different wavelength ranges via an independent SLM assemblies allows for correcting the misalignment of the corresponding excitation light sheet and keeping it in focus under different imaging conditions (for example, keeping in focus at each tiling position), so as to achieve satisfied spatial resolution.

The first laser beam after the first optical modulation and the second laser beam after the second optical modulation is combined (step 105). Next, the combined laser beams are directed to an illumination path, and a first excitation light sheet and a second excitation light sheet corresponding to the first wavelength range and the second wavelength range respectively can be generated by scanning the laser beams (step 106). Independent generation of laser beams of different wavelength ranges and independent optical modulation of the same enables independent and flexible control and adjustment of the generated first and second excitation light sheets, such as making them illuminate the same image plane and keeping in focus at all time, making them spatially separated (as shown in FIG. 2(*a*) and FIG. 2(*b*)), which can reduce fluorescence crosstalk between different color channels. In some embodiments, the combining of the first laser beam after the first optical modulation and the second laser beam after the second optical modulation can be implemented by a semi-transparent and semi-reflective optical process and/or a polarizing beam splitting process.

In step 107, the two types of excitation light sheets are tiled in a propagation direction of excitation light to illuminate the sample, and fluorescence emitted by the sample (as a response to the illumination by the tiled excitation light sheet) is collected (step 108). Therefore, the first excitation light sheet and the second excitation light sheet may be independently tiled. In some embodiments, the tiling of excitation light sheets may be implemented by loading a phase map onto a corresponding SLM assembly. Benefiting from independent operation of SLM assemblies corresponding to excitation light sheets of different wavelength ranges, each tiled excitation light sheet corresponding to a different wavelength range also keeps spatially separated from each other, which further reduces fluorescence crosstalk. In some embodiments, the fluorescence emitted by the sample includes fluorescence of a first wavelength range, which is excited by an excitation light sheet generated by a laser beam of the first wavelength range, and fluorescence of a second wavelength range, which is excited by an excitation light sheet generated by a laser beam of the second wavelength range. The thus collected fluorescence is color-mixed (a mixture of different colors), and the collected color-mixed fluorescence is then split into fluorescence of two color ranges, each of which is used for respective imaging. In some embodiments, independent imaging components are adopted to achieve fluorescence imaging in different color ranges, for example, fluorescence imaging in different color ranges are performed synchronously, so that the composite image obtained after superimposition can present information with less distortion and richer details.

Figure 3:
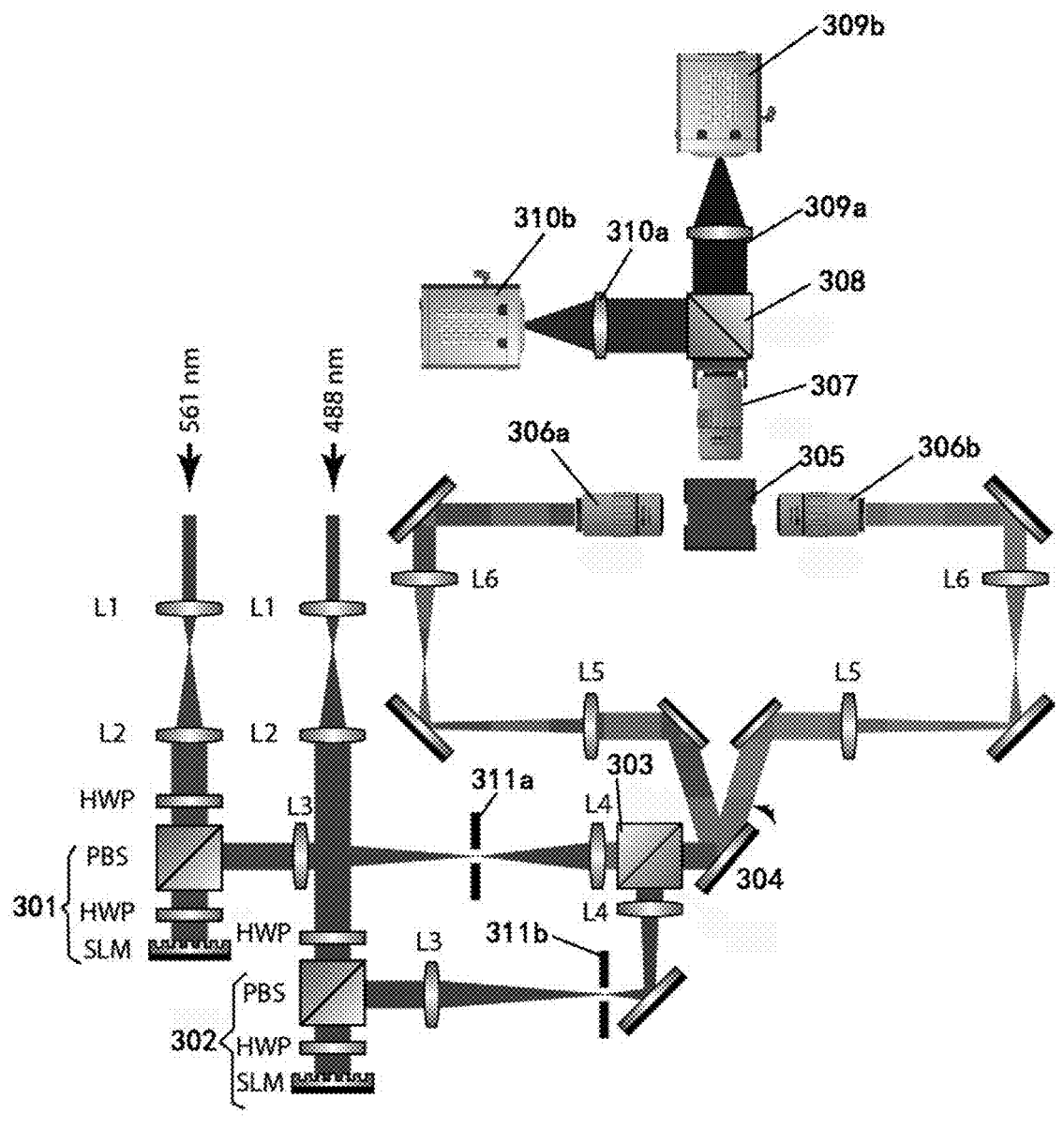
FIG. 3 shows a schematic structural diagram of the tiling light sheet microscope according to the embodiment of the present disclosure.

FIG. 3 shows a schematic structural diagram of the tiling light sheet microscope according to the embodiment of the present disclosure. As shown in FIG. 3, the tiling light sheet microscope comprises a first laser and a second laser (not shown). The first laser is configured to generate a first laser beam of a first wavelength range (exemplified as 561 nm for exciting red fluorescence), and the second laser is configured to generate a second laser beam of a second wavelength range (exemplified as 488 nm for exciting green fluorescence). In some embodiments, the first laser and the second laser are activated simultaneously and operate continuously. And synchronous (simultaneous) imaging of fluorescence of different colors can be realized by cooperating with synchronous operations of related optical components. In some embodiments, laser beam of the first wavelength range is used to excite fluorescence of the first wavelength range (i.e., first color), and laser beam of the second wavelength range is used to excite fluorescence of the second wavelength range (i.e., second color).

The tiling light sheet microscope, for excitation fluorescence of different colors, separately sets independent optical paths before beam combining. As shown in FIG. 3, the tiling light sheet microscope further comprises a first SLM assembly 301 configured to perform modulation on the first laser beam and a second SLM assembly 302 configured to perform modulation on the second laser beam. In some embodiments, the first SLM assembly 301 and the second SLM assembly 302 may be configured to operate independently, to generate two excitation light sheets, which are controlled independently and spatially separable. However, it solely functions as an example. The first SLM assembly 301 and the second SLM assembly 302, which operate independently, may perform flexibly optical modulation operations on laser beams of different wavelength ranges required according to various embodiments of the present disclosure, including, but not limited to, at least one or more of intensity profile of excitation light sheets, correction for misalignment, tiling of light sheets and focus keeping at image plane under different imaging conditions or the like. Specifically, the first SLM assembly 301 and the second SLM assembly 302 may be configured to achieve, by being loaded with phase maps respectively, independent tiling of the two types of excitation light sheets corresponding to the first wavelength range and the second wavelength range. In some embodiments, the independent tiling of the two types of excitation light sheets allows each tiled excitation light sheet corresponding to a different wavelength range to keep spatially separated from each other, thereby further reducing fluorescence crosstalk.

The tiling light sheet microscope further comprises a combining optics 303 configured to combine the first laser beam modulated with the first SLM assembly 301 and the second laser beam modulated with the second SLM assembly 302, i.e., beam-combining. A semi-transparent and semi-reflective mirror may be used as the combining optics 303, as shown in FIG. 3, to allow the first laser beam modulated with the first SLM assembly 301 to pass through and the second laser beam modulated with the second SLM assembly 302 to be reflected and then match each other in the optical path, thereby reducing the divergence of the combined beams. In some embodiments, a polarizing beam splitter also may be used as the combining optics to implement similar optical processes.

The combined beams are directed to an illumination path by offsetting an angle of the galvanometer mirror 304. The galvanometer mirror 304 is further arranged to be conjugated to respective optical modulation plane of the first SLM assembly 301 and the second SLM assembly 302, and laser generates, by scanning the laser beams, two types of excitation light sheets corresponding to the first wavelength range and the second wavelength range respectively. As an example, FIG. 3 shows two illumination paths located at two sides of an imaging chamber 305, and the excitation objectives 306a and 306b disposed at an end of each illumination path for illuminating the sample to be detected. In this way, regardless of where the sample is located in the imaging chamber 305, it is close to an excitation objective on one side, and the excitation objective on the closer side may be used to illuminate the sample to be detected at a shorter transmission distance. However, this solely serves as an example. It is also possible to set only one illumination path at one side of the imaging chamber 305.

A detection objective 307 is used to collect color-mixed fluorescence emitted by the excited sample to be detected. Next, a splitting optical component 308 is adopted to split the color-mixed fluorescence collected by the detection objective 307 into fluorescence of two color ranges, such as red fluorescence and green fluorescence. In some embodiments, a semi-transparent and semi-reflective mirror is used as the splitting optical component 308, but other optical assemblies/components are also suitable as long as fluorescence of various colors can be split. As shown in FIG. 3, the split fluorescence of first color, after being filtered by the first filter (not shown), is further imaged onto the first detection camera 309b with the first tube lens 309a. Besides, the split fluorescence of second color, after being filtered by the second filter (not shown), is further imaged onto the second detection camera 310b with the second tube lens 310a, wherein the first tube lens 309a has the same focal distance as the second tube lens 310a.

In some embodiments, the first SLM assembly 301, the second SLM assembly 302, the first detection camera 309b and the second detection camera 310b may operate in a synchronized manner. In this way, fluorescence imaging in different colors may operate in a synchronized manner, such that the composite image obtained after superimposition will present information with less distortion and richer details.

The imaging flow will be described below in details with another detailed example of the configuration of the tiling light sheet microscope shown in FIG. 3. The sample to be detected is immersed in the imaging buffer in the imaging chamber 305 and then mounted on a sample holder driven by a 3D translational stage for 3D imaging.

The excitation laser beams of 488 nm and 561 nm wavelengths are expanded to a beam diameter of approximately 8 mm (L1=30 mm, L2=250 mm), and are transmitted to two identical SLM assemblies, i.e., the first SLM assembly 301 and the second SLM assembly 302, for respective phase modulation. Each of the first SLM assembly 301 and the second SLM assembly 302 may be a binary SLM assembly, which may consist of a polarizing beam splitter cube, a half-wave plate and a 1280×1024 binary SLM (as shown in FIG. 3).

In some embodiments, each modulated laser beam may be focused on the corresponding optical slit 311a (or 311b) to block the undesired diffraction orders, and the beam combining is performed to form combined beams by using a combining optics 303, such as a semi-transparent and semi-reflective mirror. The two binary SLMs are both conjugated to the galvanometer mirror 304 through relay lenses (L3=300 mm, L4=175 mm). The galvanometer mirror 304 may direct both illumination beams to the designated one of the two symmetrical illumination paths by offsetting its initial angle and generate two types of excitation light sheets corresponding to different colors by scanning the laser beams. The modulated laser beams are further conjugated to the rear pupils of two excitation objectives 306a and 306b (for example, Mitutoyo MY5X-802) through two pairs of relay lenses (L5=L6=150 mm) respectively to illuminate the sample from two opposite directions.

The fluorescence emitted from the sample are collected with the excitation objectives 309b and 310b, such as Mitutoyo MY10X-804, for tissue imaging at micron-level spatial resolution. Detection objectives 309b and 310b with a higher numerical aperture (NA) may be used for tissue imaging at submicron-level spatial resolution. The collected fluorescence are split by a semi-transparent and semi-reflective mirror for long-pass imaging as the splitting optical component 308, and further imaged, after passing through two single-band band pass filters, onto two detection cameras with two tube lenses 309a and 310a having identical focal lengths (L=150 mm) for capturing tissue images.

In some embodiments, the tiling light sheet microscope is calibrated before it is used for simultaneous dual-color imaging. The imaging chamber 305 may be filled with a mixture of Alexa Fluor 488 and Alexa Fluor 561 dye solutions for calibration. Because a laser with a wavelength of 488 nm excites two dyes separately, the excited laser beams are observed on both detection cameras 309b and 310b. The detection paths of two color channels are calibrated with the excitation beam with a wavelength of 488 nm as a reference, so that both detection cameras 309b and 310b are focused on the same image plane. Meanwhile, both detection cameras 309b and 310b have the same FOVs and magnifications. Next, the phase maps for modulating the two types of laser beams are generated separately. Two groups of calibrated phase maps are loaded onto the two SLM assemblies 301 and 302 in sequences to tile the excitation light sheets of two color ranges at different positions during tiling, to image the entire FOV while minimizing the fluorescence crosstalk. Both the SLM assemblies 301 and 302 as well as both the detection cameras 309b and 310b are synchronized by the same trigger signal during imaging.

FIGS. 4(a)-4(h) show a schematic diagram of calibration of the tiling light sheet microscope for simultaneous dual-color imaging using dye solution according to the embodiment of the present disclosure.

Figures 4A, 4B, 4C, 4D:
FIGS. 4(a)-4(h) show a schematic diagram of calibration of the tiling light sheet microscope for simultaneous dual-color imaging using dye solution according to the embodiment of the present disclosure.

As shown in FIG. 4(a), the excitation light sheets of 488 nm are tiled at 6 tiling positions ($NA_{OD}$=0.05, $NA_{ID}$=0.015) by loading a group of phase maps, thereby generating the tiled light sheets of 488 nm shown in FIG. 4(b). As shown in FIG. 4(c), the excitation light sheets of 561 nm are tiled simultaneously at 6 tiling positions spatially separated from the excitation light sheets of 488 nm ($NA_{OD}$=0.05, $NA_{ID}$=0.015) by loading a group of phase maps, thereby generating the tiled light sheets of 561 nm shown in FIG. 4(d).

Figures 4E, 4F, 4G, 4H:
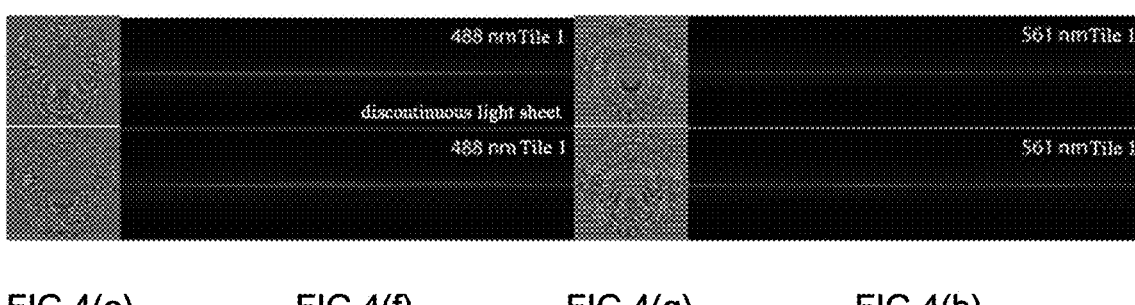

FIGS. 4(e)-4(h) show schematic diagram of tiling a group of the discontinuous excitation light sheets. As shown in FIG. 4(e), a group of the discontinuous excitation light sheets of 488 nm are tiled ($NA_{OD}$=0.07, $NA_{ID}$=0.02) by loading a group of phase maps, so as to generate the discontinuous excitation light sheet of 488 nm as shown in FIG. 4(f). As shown in FIG. 4(g), a group of the discontinuous excitation light sheets of 561 nm are tiled ($NA_{OD}$=0.07, $NA_{ID}$=0.02) by loading a group of phase maps, with the waist of each excitation light sheet of 561 nm separated from that of the discontinuous excitation light sheets of 488 nm. Thus, the discontinuous excitation light sheet of 561 nm as shown in FIG. 4(h) is generated.

To evaluate the ability of the imaging method according to each embodiment of the present disclosure applied to simultaneous dual-color imaging, with the calibration process of the tiling light sheet microscope for simultaneous dual-color imaging using dye solution according to the embodiment of the present disclosure as shown in FIGS. 4(a)-4(d), an approximately 5 times expanded planarian *Schmidtea mediterranea* labeling the neuron pools (Fluorescein) and axon projections (Rhodamine B) is imaged.

As shown in FIGS. 4(a)-4(d), the excitation light sheets of 488 nm and 561 nm are tiled at 6 positions in the image plane to image the expanded planarian at approximately $1.5 \times 1.5 \times 4$ $\mu m^3$ spatial resolution, which corresponds to approximately $0.3 \times 0.3 \times 0.8$ $\mu m^3$ considering the 5 times expansion ratio of the planarian. By imaging subsample volume of $10 \sim 1.5 \times 1.5 \times 2$ $mm^3$ in one hour, the planarian is imaged in two color ranges. The excitation light sheets of 488 nm are tiled from tiling position 1 to 6 in each imaging plane to image distribution of the neurons. The excitation light sheets of 561 nm are tiled from tiling positions 4 to 6 followed by tiling positions 1 to 3 during imaging to image projections of the neuron axons and to keep a maximal distance between the two light sheets at all time. As a result, compared with the sequential dual-color imaging, the imaging time is reduced by 50% and the imaging throughput is doubled. As the amount of the sample increases, this advantage will become more prominent.

Figures 5A, 5B, 5C, 5D, 5E, 5F:
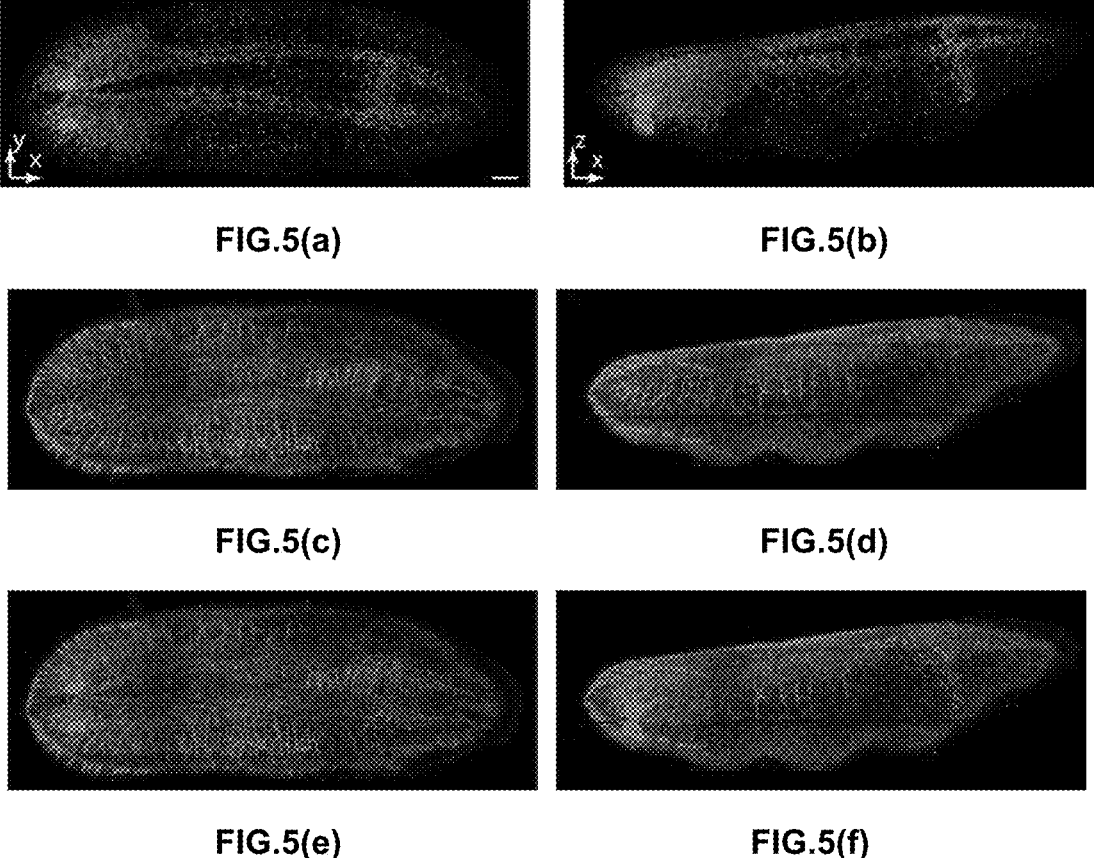
FIGS. 5(a)-5(f) show detailed results of a planarian *Schmidtea mediterranea* applied with the simultaneous dual-color imaging method according to the embodiment of the present disclosure.

FIGS. 5(a)-5(f) show the results of evaluating imaging. FIGS. 5(a) and 5(b) show the lateral and axial maximum intensity projections (MIPs) of the planarian neuron pool. FIGS. 5(c) and 5(d) show the lateral and axial maximum intensity projections (MIPs) of the axonal projections of the planarian neurons. FIGS. 5(e) and 5(f) show the lateral and axial MIPs of the planarian, showing both neuron pool and axonal projections of neurons. The imaging results clearly demonstrate the relationship between planarian neurons and axonal projections of neurons.

The above description is intended to be illustrative and not limiting. For example, the above-mentioned examples (or one or more solutions thereof) may be used in combination with each other. For example, those of ordinary skill in the art may use other embodiments when reading the above-mentioned description. In addition, in the above-mentioned specific embodiments, various features may be grouped together to simplify the present disclosure. This should not be interpreted as an intention that features of the disclosure that do not require protection are necessary for any of the claims. Rather, the subject matter of the present disclosure may be less than the full range of features of a particular disclosed embodiment. Therefore, the following claims are incorporated herein as examples or embodiments in the particular embodiment, each claim stands alone as a separate embodiment, and it is contemplated that these embodiments may be combined with each other in various combinations or permutations. The scope of the present invention shall be determined by reference to the full scope of the appended claims and equivalent forms to which these claims are entitled.

The above embodiments are only exemplary embodiments of the present disclosure, and are not used to limit the present invention. The scope of protection of the invention is defined by the claims. Those skilled in the art can make various modifications or equivalent substitutions to the invention within the essence and protection scope of the disclosure, and such modifications or equivalent substitutions should also be regarded as falling within the protection scope of the invention.

What is claimed is:

1. A tiling light sheet microscope, wherein, the tiling light sheet microscope comprises:
   a first laser configured to generate a first laser beam of a first wavelength range;
   a first spatial light modulator (SLM) assembly configured to perform modulation on the first laser beam;
   a second laser configured to generate a second laser beam of a second wavelength range;
   a second spatial light modulator (SLM) assembly configured to perform modulation on the second laser beam;
   a combining optics configured to combine the first laser beam modulated with the first SLM assembly and the second laser beam modulated with the second SLM assembly;
   a galvanometer mirror configured to direct the combined laser beams to an illumination path by offsetting an angle of the galvanometer mirror, and to generate, by scanning the laser beams, first excitation light sheets and second excitation sheets corresponding to the first wavelength range and the second wavelength range, respectively, the galvanometer mirror being further arranged to be conjugated to respective optical modulation planes of the first SLM assembly and the second SLM assembly, the first excitation light sheets being tiled via the first SLM assembly and the second excitation light sheets being tiled via the second SLM assembly;
   an excitation objective disposed at an end of the illumination path for illuminating a sample to be detected, the rear pupil of which is conjugated to the respective optical modulation planes of the first SLM assembly and the second SLM assembly; and
   a detection objective configured to collect fluorescence emitted by the sample to be detected.

2. The tiling light sheet microscope of claim 1, wherein, the first laser and the second laser are simultaneously activated and operate continuously.

3. The tiling light sheet microscope of claim 1, wherein, the first SLM assembly and the second SLM assembly are configured to operate independently, so as to generate two excitation light sheets which are controlled independently and spatially separable.

4. The tiling light sheet microscope of claim 1, wherein each of the first SLM assembly and the second SLM assembly are loaded with phase maps, respectively.

5. The tiling light sheet microscope of claim 4, wherein, the independent tiling of the two types of excitation light sheets allows each tiled excitation light sheet corresponding to a different wavelength range to keep spatially separated from each other.

6. The tiling light sheet microscope of claim 1, wherein, the combining optics includes a semi-transparent and semi-reflective mirror and/or a polarizing beam splitter.

7. The tiling light sheet microscope of claim 1, wherein, laser beam of the first wavelength range is used to excite fluorescence of the first wavelength range, and laser beam of the second wavelength range is used to excite fluorescence of the second wavelength range.

8. The tiling light sheet microscope of claim 1, further comprising a splitting optical component configured to split mixed fluorescence of different colors collected by the detection objective into fluorescence of two color ranges.

9. The tiling light sheet microscope of claim 8, wherein, the splitting optical component includes a semi-transparent and semi-reflective mirror.

10. The tiling light sheet microscope of claim 8, further comprising:

a first filter, a first tube lens and a first detection camera, the split fluorescence of first color, after being filtered by the first filter, being further imaged onto the first detection camera with the first tube lens; and a second filter, a second tube lens and a second detection camera, the split fluorescence of second color, after being filtered by the second filter, being further imaged onto the second detection camera with the second tube lens, wherein the first tube lens has the same focal distance as the second tube lens.

11. The tiling light sheet microscope of claim 10, wherein, the first SLM assembly, the second SLM assembly, the first detection camera and the second detection camera operate in a synchronized manner.

12. The tiling light sheet microscope of claim 1, wherein, the illumination path includes a first illumination path and a second illumination path symmetrically located at two sides of an imaging chamber, and the excitation objective includes a first excitation objective at an end of the first illumination path and a second excitation objective at an end of the second illumination path.

13. An imaging method of a sample, wherein, the imaging method comprising:

generating a first laser beam of a first wavelength range;

generating a second laser beam of a second wavelength range;

performing a first optical modulation on the first laser beam;

performing a second optical modulation on the second laser beam;

combining the first laser beam after the first optical modulation and the second laser beam after the second optical modulation;

directing the combined laser beams to an illumination path, and generating, by scanning the laser beams, a first excitation light sheet and a second excitation light sheet corresponding to the first wavelength range and the second wavelength range respectively;

tiling the two types of excitation light sheets in a propagation direction of excitation light so as to illuminate the sample; and collecting fluorescence emitted by the sample.

14. The imaging method of claim 13, wherein, the first laser beam and the second laser beam are simultaneously activated and continuously generated.

15. The imaging method of claim 13, wherein, the first excitation light sheet and the second excitation light sheet are respectively independently controlled and spatially separated.

16. The imaging method of claim 13, wherein, the first excitation light sheet and the second excitation light sheet are independently tiled.

17. The imaging method of claim 13, wherein, an independent tiling of the two types of excitation light sheets allows each tiled excitation light sheet corresponding to a different wavelength range to keep spatially separated from each other.

18. The imaging method of claim 13, wherein, the combining of the first laser beam after the first optical modulation and the second laser beam after the second optical modulation is implemented by a semi-transparent and semi-reflective optical process and/or a polarizing beam splitting process.

19. The imaging method of claim 13, wherein, the fluorescence emitted by the sample includes fluorescence of a first wavelength range, which is excited by an excitation light sheet generated by a laser beam of the first wavelength range, and fluorescence of a second wavelength range, which is excited by an excitation light sheet generated by a laser beam of the second wavelength range.

20. The imaging method of claim 13, further comprising splitting the collected mixed fluorescence of different colors into fluorescence of two color ranges.

21. The imaging method of claim 13, wherein, the first optical modulation and the second optical modulation are performed synchronously.

22. The imaging method of claim 13, wherein, the sample is a cleared biological tissue or a biological tissue which is transparent in a natural state.

* * * * *